United States Patent

[11] 3,578,120

| [72] | Inventor | Conrad R. Hilpert |
| --- | --- | --- |
| | | Winnebago, Ill. |
| [21] | Appl. No. | 849,048 |
| [22] | Filed | Aug. 11, 1969 |
| [45] | Patented | May 11, 1971 |
| [73] | Assignee | Twin Disc Incorporated |
| | | Racine, Wis. |

[54] TORQUE TRANSMISSION HAVING ACCELERATION RESPONSIVE FLUID CONTROL MEANS
11 Claims, 16 Drawing Figs.

[52] U.S. Cl............................................. 192/103C,
192/103FA, 192/105F, 137/48, 137/56, 192/3.33
[51] Int. Cl........................................................F16d 43/24,
F16d 43/284
[50] Field of Search............................................ 192/103
(C), 103 (F-1); 74/(Inquired)

[56] References Cited
UNITED STATES PATENTS

| 1,608,778 | 11/1926 | Dunwoodie................. | 192/103C |
| --- | --- | --- | --- |
| 2,002,058 | 5/1935 | Gregg.......................... | 192/103C |
| 2,208,865 | 7/1940 | Gette........................... | 192/103C |
| 2,381,786 | 8/1945 | Tyler............................ | 192/103F-1 |
| 2,646,150 | 7/1953 | Hobbs.......................... | 192/103F-1 |
| 2,715,455 | 8/1955 | Miller........................... | 192/103C |
| 3,282,385 | 11/1966 | Snyder......................... | 192/103F-1 |
| 3,421,608 | 1/1969 | Gorder......................... | 192/103F-1 |

*Primary Examiner*—Benjamin W. Wyche
*Attorney*—James E. Nilles

ABSTRACT: Power transmitting devices, such as friction clutches including disengageable friction plates, and having means for sensing the deceleration or acceleration of relatively moving parts and which can be utilized to control the slippable friction clutch and thereby limit the torque peaks transmitted by the clutch and aid in control of input or output speed.

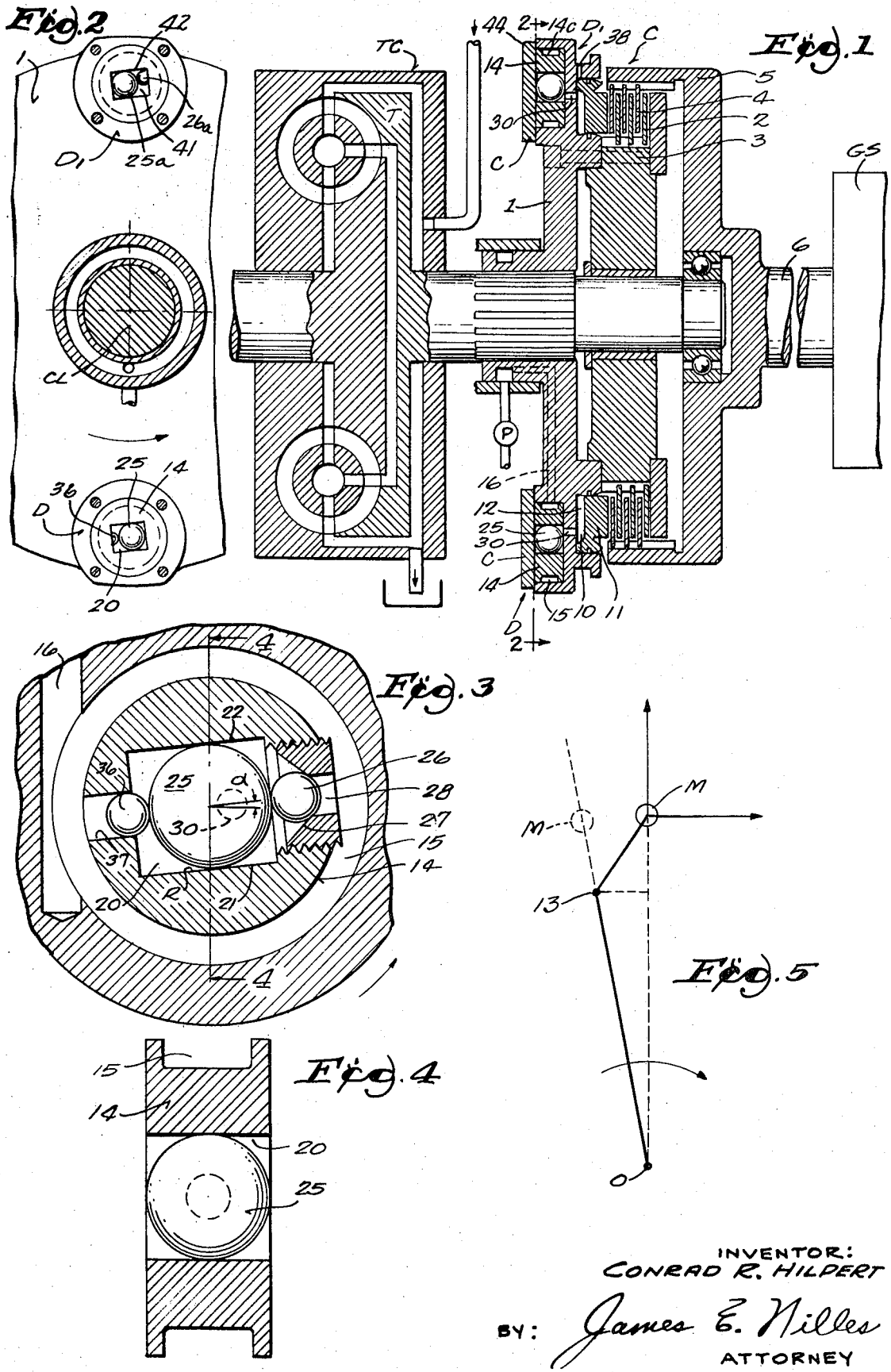

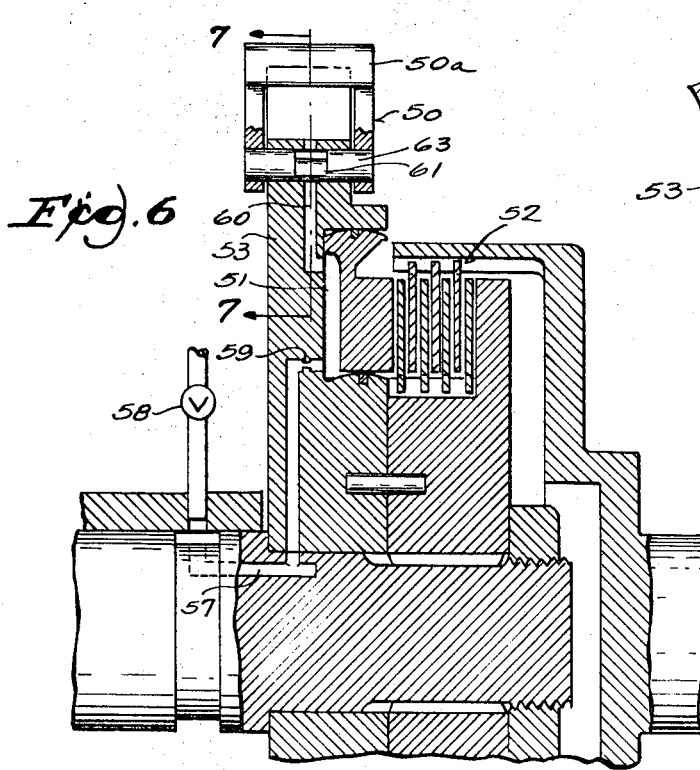
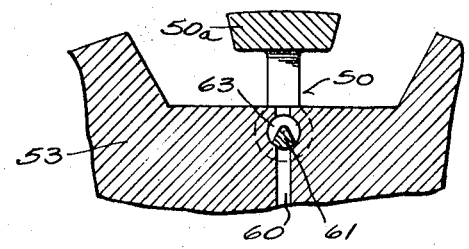
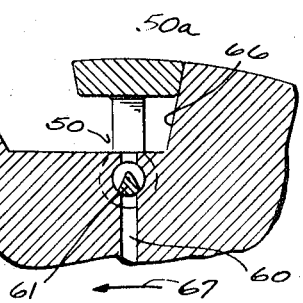
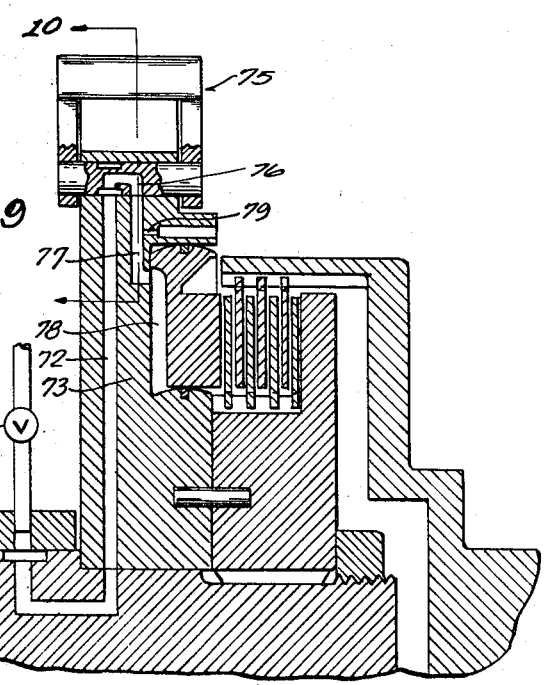
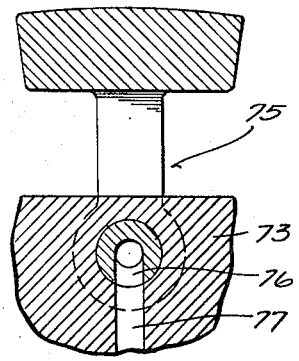

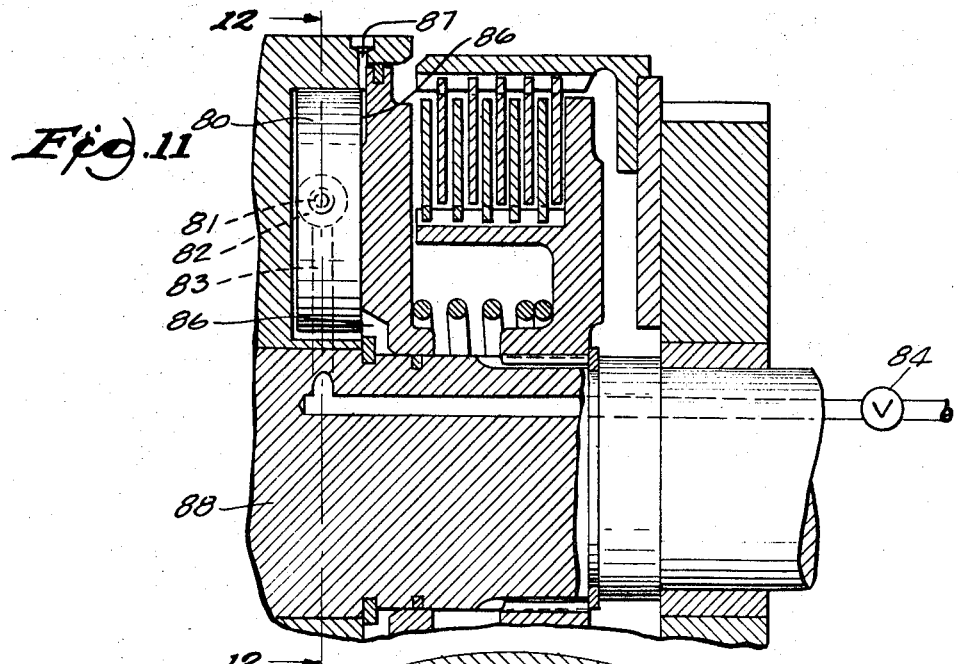
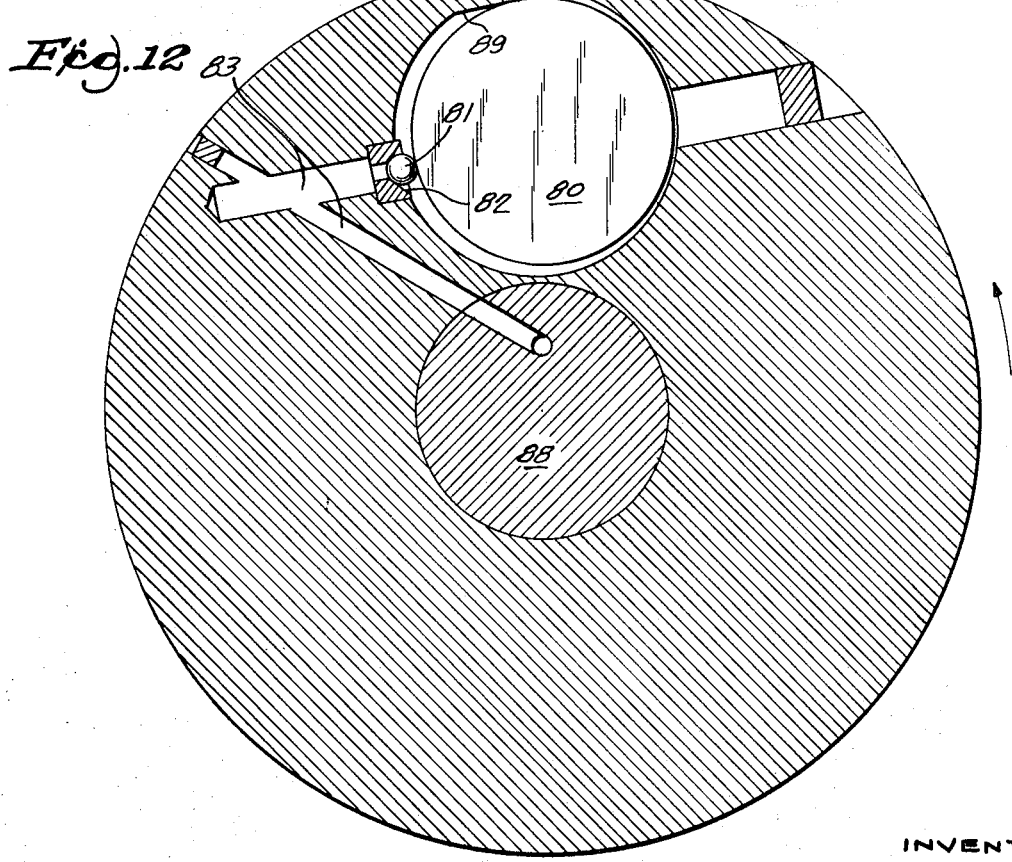

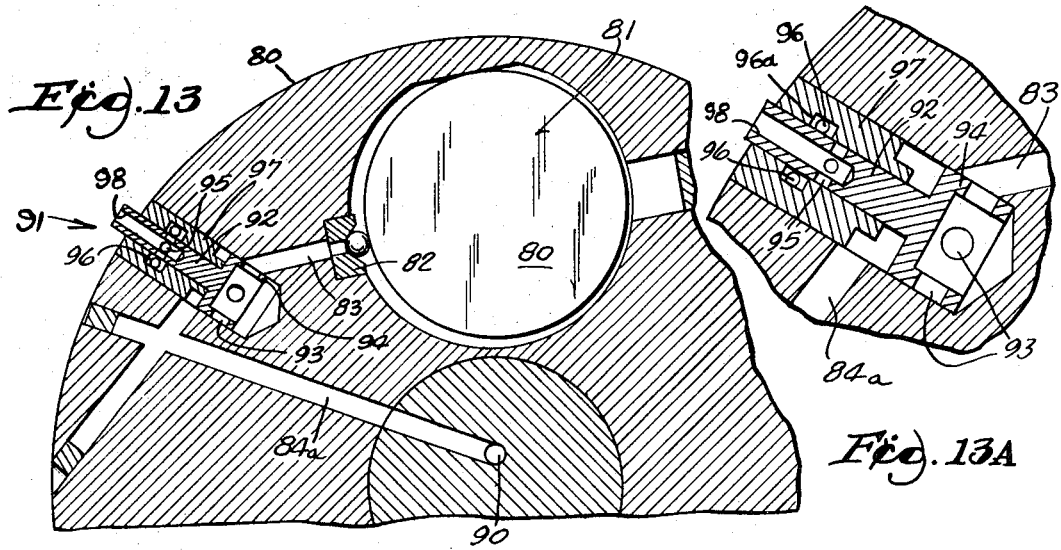
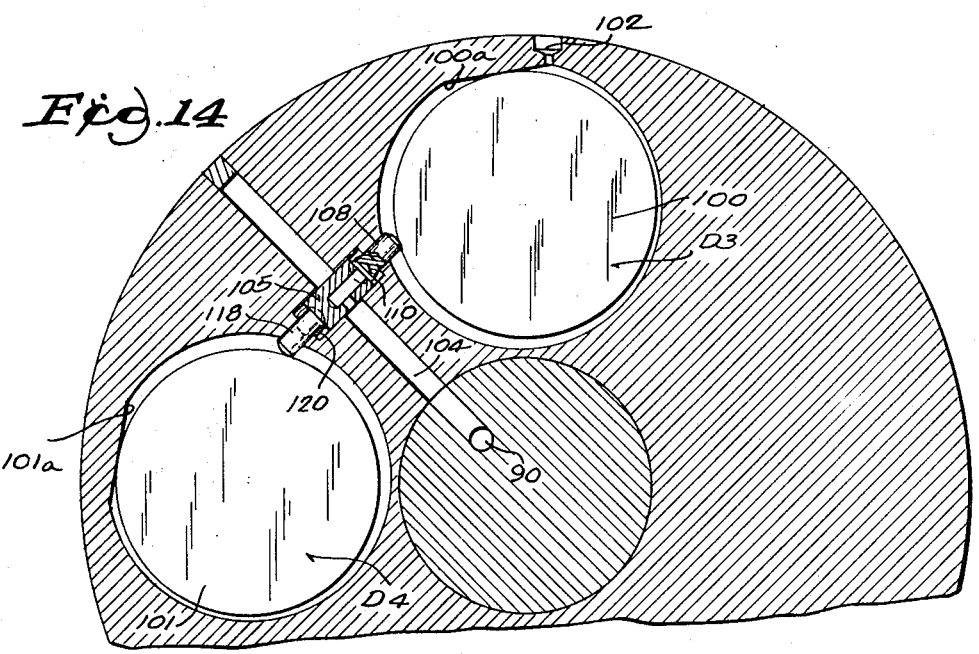
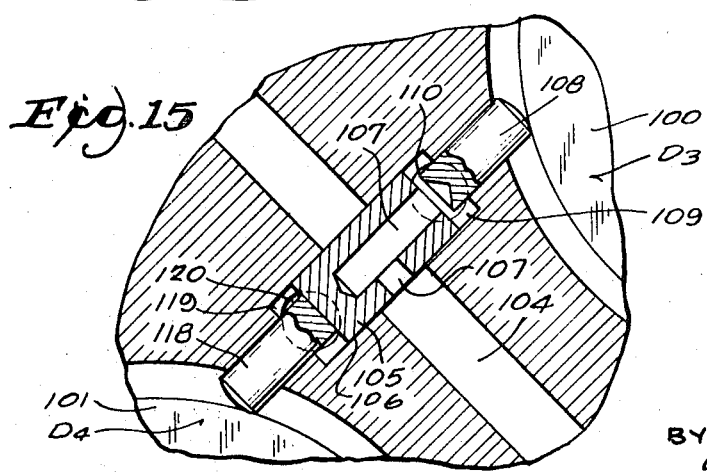
INVENTOR:
CONRAD R. HILPERT
BY: James E. Nilles
ATTORNEY 3,578,120

1

TORQUE TRANSMISSION HAVING ACCELERATION RESPONSIVE FLUID CONTROL MEANS

BACKGROUND OF THE INVENTION

This invention pertains to hydraulically actuated friction devices, such as clutches or brakes, which have hydraulic means for varying the amount of clamp up between the interleaved clutch plates and thereby providing a controllable amount of slip between the drive and driven members of the clutch. In certain transmissions, it is desirable to control the speed of the input or output members, and speed controls for doing this are shown in the copending U.S. Pat. application, Ser. No. 725,974 filed May 2, 1968 which issued on Sept. 30, 1969 as U.S. Pat. No. 3,469,663 or in the copending U.S. application, Ser. No. 829,169, filed June 2, 1969.

In prior art devices of this general character, the coefficient of friction of the clutch surface changes considerably during operation of the device, and as a result, the load or prime mover may be subjected to a different torque than originally intended or desired. Attempts to overcome these shortcomings are shown in the U.S. Pat. No. 3,420,344 issued Jan. 7, 1969.

Certain prior art devices have utilized output responsive friction clutches as shown in the U.S. Pats. 3,352,395 of Nov. 14, 1967; 3,358,796 of Dec. 19, 1967, both of which are output speed responsive clutches having centrifugally operated valve means, or as shown in the U.S. Pat. No. 3,360,087 issued Dec. 26, 1967 which is a friction clutch that utilizes the output torque as the controlling criterion. All of the above patents have been assigned to an assignee common with the present application.

In addition to being able to control the speed of the input or output member as above referred to, it is desirable to be able to limit the torque peaks transmitted by the clutch and the present invention is directed to that aspect.

SUMMARY OF THE INVENTION

The present invention relates to power transmissions of the type having hydraulically actuated friction plates capable of being variably clamped so as to be able to control the amount of slipping of the clutch and consequently, the power delivered through it. The invention includes means for sensing the deceleration or acceleration of one of the relatively movable parts and in which said deceleration or acceleration is used to control the amount of actuating fluid being applied to the hydraulically actuated clutch, thereby providing a transmission having torques limited to a designed amount.

The equation $T = I\alpha$, where $T$ = torque, $I$ = rotational moment of inertia and $\alpha$ = angular acceleration, illustrates that if acceleration $\alpha$ is limited, then torque $T$ is also limited as the moment of inertia $I$ is fixed by the design and manufacture of the parts. Thus, the present invention causes the magnitude of $\alpha$ to control the clamping pressure of the clutch and therefore also controls torque $T$. This limiting of $\alpha$ also inhibits quick changes in speed allowing easier control of speed by other devices, as referred to previously.

The control mechanism of the present invention functions according to the following formula:

$$T_c = T_2 \text{ plus } K(N_2)^2$$

where; $T_c$ = clutch torque at any given instant, $T_2$ = the torque, at a given instant, of the driving device which drives the clutch, such as a torque converter, to which the control mechanism is attached; or the torque, at a given instant of the load driven by the control mechanism and to which the latter is attached, $K$ = constant of proportionality of several parts of the control mechanism, $N_2$ = speed of rotation, at a given instant, of either the power input device or the load, whichever the control mechanism is attached to.

The present invention provides a friction type clutch when, for example driven by a torque converter, which limits the maximum heat rate in the clutch to a relatively low value which can be predetermined by the clutch designer, and which heat rate will not be an unknown variable due to the changing coefficient of friction in the clutch surfaces while the clutch is operating. The clutch of the present invention also permits the maximum engaging peak torque to be predetermined at a relatively low value, and which torque at lock-up never exceeds the stall torque, rather than having the maximum engaging peak torque be dependent on the varying coefficient of friction in the clutch plates during operation. The clutch of the present invention furthermore permits the use of any desired high engaging fluid pressure and which does not effect the heat rate or torque peak. Furthermore, the clutch of the present invention causes the maximum torque of the clutch to be automatically reduced at engine idle to thereby give ideal gear shifts at reduced engine speed.

When the sensing mechanism carrying member is driven by other than a torque converter or is driving various loads, it will, depending on the torque versus speed characteristics of the prime mover or load, have various combinations of the above features, which allow the satisfaction of the above equation.

The hydraulically actuated, friction type clutch of the present invention senses and controls the acceleration or deceleration of either the output portion or input portion of the clutch by increasing or decreasing the clutch apply pressure.

These and other objects and advantages of the present invention will appear hereinafter as this disclosure progresses, reference being had to the accompanying drawings.

BRIEF DESCRIPTION OF THE DRAWINGS

FIG. 1 is a longitudinal cross-sectional view through a transmission embodying the present invention;

FIG. 2 is a transverse, vertical cross-sectional view taken along line 2–2 in FIG. 1;

FIG. 3 is an enlarged view of a portion of the device shown in FIG. 2, that is one of the valve device D;

FIG. 4 is a view taken along line 4–4 in FIG. 3;

FIG. 5 is a vector diagram which illustrates the principles of the present invention;

FIG. 6 is a fragmentary, cross-sectional, longitudinal view of a transmission embodying the present invention, of modified form;

FIG. 7 is a cross-sectional view taken along line 7–7 in FIG. 6;

FIG. 8 is a view similar to FIG. 7, but showing a modification thereof;

FIG. 9 is a view similar to FIG. 6, but showing a further modification;

FIG. 10 is a cross-sectional view taken along line 10–10 in FIG. 9;

FIG. 11 is a view of another modified form of the invention, the view being a fragmentary, cross-sectional, longitudinal view of a transmission embodying the present invention;

FIG. 12 is a cross-sectional view taken along line 12–12 in FIG. 11;

FIG. 13 is a view similar to FIG. 12, but showing a modification;

FIG. 13A is an enlarged view of the valve element and its mounting as shown in FIG. 13;

FIG. 14 shows another modified form of the invention;

FIG. 15 is an enlarged, detail view of a portion of the device shown in FIG. 14.

DESCRIPTION OF A PREFERRED EMBODIMENT

A clutch made in accordance with the present invention may be used with different types of vehicles or machinery. For example, the clutch can be used on the output side of a torque converter so that the torque converter turbine drives the input portion of the clutch. The invention finds particular utility when used with a torque converter because the turbine when under a load will decelerate, and it is that deceleration which it is desirable to sense by means of the control mechanism of the present invention.

The invention may also be used on a mixer, for example, and in that event the control mechanism would be located on the output member of the clutch so as to sense the acceleration of the load, that is sense the acceleration at the output side of the clutch and cause the clutch to be actuated accordingly.

The present control device is useful in controlling either the acceleration or deceleration of either the input portion or the output portion of a hydraulically actuated, friction type clutch.

FIGS. 1 TO 5

As shown in FIG. 1, a clutch C made in accordance with the present invention includes an input portion or member 1 which receives its power from the turbine T of a torque converter TC. The torque converter is located ahead of the clutch and transmits power to the clutch. The input member 1 has a series of friction plates 2 axially slideable on its hub member 3 and these plates are interleaved with other plates 4 that are axially splined on the drum 5 of the clutch output member 6. The input member 1 also has an annular cylindrical chamber 10 formed therein and a piston 11 sealingly slides in this chamber to form therewith an expansible fluid actuating chamber 12. Pressurization of chamber 12 causes the piston 10 to bear against the interleaved clutch plates and clamp them up in clutch engaging relationship. The amount of pressurization of the expansible chamber 12 can be varied so as to thereby vary the amount of clutch plate clamp up and consequently, vary the amount of slipping between the clutch plates and the power delivered by the clutch to the gear shaft means GS.

Thus a power transmission is provided having a slipping drive establishing means and an actuating chamber therefor. An input member and an output member are operatively connected to the drive establishing means.

As is explained in the prior art patents previously referred to herein, the coefficient of friction between the clutch plates varies considerably and unpredictably during clutch operation and therefore, clutches of this general character deliver torque peaks far greater than the machines which they drive were intended to absorb. Consequently, these driven machines were required to be designed far in excess of the strength that would ordinarily be required of them. A desirable, ideal torque peak capacity of a clutch, behind a torque converter for example, would be torque which is equal to the stall torque and no greater. These high peak torques, as well as being detrimental to the life of the driven machinery, often caused discomfort to the operator and sometimes resulted in his losing control of the apparatus.

Two reasons, among others, for very little appreciable control over the magnitude or timing of the torque peaks are due (1) to the clutch time delay, and as previously mentioned, (2) to the variation of coefficient of friction in the clutch.

Referring now to FIG. 5 of the drawings, this schematic diagram illustrates the general principle of the present invention and reference to it may be helpful before a detailed explanation proceeds. Assume a rigid rotating member such as a clutch housing is rotating in the direction of the curvilinear arrow and about a point O, and a pendulum M is swingably pivoted at 13 to the housing. The dotted line position of the pendulum M is the position it occupies due to centrifugal force and while the housing is rotating at a constant speed. However, the moment that the rotational speed of the housing decelerates, the pendulum would swing ahead of point 13 and assume the full line position shown in FIG. 5. The present invention utilizes this general principle and locates a fluid valve generally so that it will be actuated by movement due to deceleration or acceleration, as will appear.

The greater the amount of centrifugal force, the greater the deceleration must be in order to actuate the valve. The torque delivered by the clutch thereby is a function of the square of its centrifugal speed.

CONTROL VALVE

Referring to FIGS. 2, 3 and 4, two control valve devices D and D1 are shown, device D will be described first. Device D includes a generally cylindrical member 14, shown as being located in the input member of the clutch for rotation in the direction of the curvilinear arrow about the centerline CL of the clutch. Member 14 has an annular passage 15 formed around its periphery which is in communication, via conduit 16, with an external source of pressure fluid, such as the fluid pump P.

Located centrally in the cylinder member 14 is a rectangular opening 20 having an angularly disposed ramp R defined by parallel sides 21 and 22 which are disposed at an angle $\alpha$ to the diameter of the clutch which passes through 20. Located for sliding engagement in the opening 20 is a large ball 25 which can abut against a smaller ball valve 26, the ball valve 26 in turn can seal against its seat 27, thereby blocking the passage 28 which is in communication with the annular groove 15. Another passage 30 leads from opening 20 and is for the purpose of conducting fluid to the actuating chamber 12 of the friction clutch. However, when the ball valve 26 is seated, the supply of pressure fluid to the actuating chamber of the clutch is blocked. This seating action occurs due to deceleration of the clutch member 1, because the ball 25 rolls "up" the ramp, that is towards the center of the clutch, to thereby urge the ball valve 26 against its seat. On the other hand, when the clutch housing 1 is rotating at a constant velocity, the ball 25 assumes a position on a radial line of the clutch thereby permitting ball valve 26 to be unseated. The above described arrangement is for a situation when the valve is located on the input member of a clutch and it is desired to cut off pressure fluid to the actuating chamber of the friction clutch, to thereby control the deceleration of a member ahead of it in the power train, for example, the output of the torque converter.

For the purpose of balancing the seat area of ball valve 26, a pressure balancing ball 36 is provided in the passage 37 in cylinder 14. Thus, ball 36 acts to counterbalance the effective piston area of ball valve 26 as it seats in seat 27 and provides a particularly sensitive valve control device.

In summary then, upon deceleration of the clutch input member 1, the large ball 25 rolls up the inclined or angularly disposed ramp R and ball valve 26 then shuts off the flow of pressure fluid to the actuating chamber of the friction clutch. Thereupon, the pressure fluid in the clutch actuating chamber can bleed out, for example out of an orifice 38, thereby decreasing clutch clamp up and permitting slipping thereof.

It may not be necessary to provide a bleed orifice 38 if the normal leakage from the actuating chamber is sufficiently great. Furthermore, other means may be used in place of a bleed orifice, such as a dump valve.

When the above described deceleration diminishes, the centrifugal force will again push the balls away from the fluid blocking position, that is down the ramp, towards the outer diameter of the clutch, thus permitting pressure fluid to again be admitted to the actuating chamber 12 of the clutch.

ADJUSTMENT OF RAMP ANGLE

The cylinder member 14 may be adjustably rotated to any one of a number of positions in the input member 1 for thereby adjusting the angle of the ramp R. It has been found however, that a ramp having an $\alpha$ angle of about 5° or 6° is typical of a practical device but other angles can be used under certain circumstances.

This valve element 14 is made circular so that the angle of its ramp surface may be adjusted to any desired angle relative to a radius. Loosening clamp plate C allows this adjustment to be made. Large ball 25 affected by acceleration or deceleration forces rolls up the ramp, forcing ball valve 26 into its seat.

Balance ball 36 is made to be of essentially the same area as the effective valve seat of valve 26, or slightly larger or smaller as the immediate design may demand.

The sensitivity of the valve thus can be adjusted by changing the angle of the ramp by rotating the valve member 14 in its position in the carrier 1. As the ramp angle becomes steeper and steeper, greater and greater decelerations are necessary to allow ball 25 to roll up the ramp, causing ball valve 26 to seat, stopping the flow of oil. Thus, pressure supplying the clutch is turned off. This decreases the clamp of the plates which decreases the deceleration affecting ball 25, allowing the centrifugal force to cause it to roll down the ramp, allowing ball 26 to admit more fluid pressure. In the equation mentioned above, where $T_c$ equals $T_2$ plus $K (N_2)^2$, adjusting the angle of the valve ramp varies the value of K. If the ramp is essentially parallel to a radius of the clutch and ball 26 is at a smaller diameter than ball 25, the device is essentially turned off. The equation becomes that of a simple friction clutch where $T_c$ (the torque of the clutch) is dependent upon the apply pressure and the coefficient of friction. If element 14 is turned so that the ramp is essentially normal to a radius, the term K becomes O. That is to say, there would exist a condition wherein the device would not work from a practical standpoint and it would probably turn on and off in an indeterminate manner. The acceleration limit would be indeterminate which would be an impractical condition. (Assuming the mass of ball 26 to be relatively small compared to that of 25).

It will be noted that the carrier has in it two valve devices D and D1, oriented in opposite directions. The deceleration which causes ball 25 to roll up its ramp, closing its valve seating surface, also causes the ball 25a to roll up its ramp in its valve, opening its valving seat by allowing ball 26a to roll away from its seated position. Oil from the clutch apply chamber surrounds valve element 14a, in its peripheral groove 14c. When ball 25a allows ball 26a to unseat, pressure from area 30 can flow to area 41. Pressure from area 41 communicates with the atmosphere by a hole 42 through the cover plate 44 of valve device D1 and into area 41, containing the ball 25a. This valve device D1 is adjustable exactly as valve device D.

This system includes two valve devices, one which upon excessive deceleration shuts off the clutch inlet, and the other upon excessive deceleration, opens the dump port, releasing the clutch. This system can be made to sense decelerations in either direction by rotating one of the devices completely around so that it senses decelerations opposite to that of the other device. Thus, one device will sense deceleration to clockwise motion, the other would sense decelerations to counterclockwise motion. Valve D is shown such that it would decrease the clutch pressure by shutting off the inlet if the rotation counterclockwise suddenly experienced a deceleration. Valve D1 if rotated to a position symmetrical to that shown, namely about a diametrical line passing through the center of the two valves, would dump the clutch upon experiencing decelerations to rotation in the clockwise direction.

If it is desired to control the acceleration of the output member 6 of the clutch, the control valves D and D1 would be located on the output member to sense the acceleration of the load L driven by the output member 6.

FIGS. 6 TO 8

The arrangement shown in FIGS. 6 to 8 illustrate the invention using a pendulum-type valve 50 which controls the dumping of pressure fluid from the actuating chamber 51 of a clutch 52. The valve 50 is mounted in the power input member 53, driven for example, by the torque converter turbine T. Pressure fluid flows through passage means 57 from a manual valve 58 for example, and flows through an orifice 59 and into the actuating chamber 51. A fluid dumping passage 60 then leads radially outward from chamber 51 where it can be blocked off by the oscillating valve element 61 of pendulum valve 50. That is to say, when the input member 53 is rotating at a constant rate, the pendulum valve 50 assumes the radially extending, "straight out" position shown in FIG. 7, and its element 61 blocks passage 60 thereby preventing dumping of fluid from the clutch actuating chamber 51. If power input member 53 decelerates, the weight position 50a of valve 50 would swing ahead in respect to the direction of rotation of member 53, pivoting about its pivotal mounting shaft 63, thereby causing element 61 to rotate and open passage 60 to dump. This relieves the clutch actuating pressure, causing the clutch to release.

It should be noted that this pendulum-type valve is inherently bidirectional, that is to say, the direction of rotation and acceleration in either direction, or deceleration in either direction will cause release of the clutch.

As shown in FIG. 8, the valve has been made to be a unidirectional control by means of the stop 66 which permits swinging of the pendulum in only one direction. With this arrangement, the direction of rotation would be as indicated by the curvilinear arrow 67, and the pendulum valve functioning upon a deceleration of this velocity.

Thus, the pendulum-type valve of FIGS. 6 to 8 is provided for dumping fluid from the actuating chamber of the clutch when the clutch is continuously being filled through the orifice 59.

FIGS. 9 AND 10

Another type of pendulum valve is shown in these FIGS. which functions to shut off the fluid supply passage to the clutch actuating chamber, upon excessive deceleration or acceleration of the rotating member to which it is attached. High pressure fluid flows, from a manual valve 70 for example, through passage 72 in the input member 73 and to the pendulum valve 75. When the valve is in the "straight out" or radial position, as shown in the FIGS., that is when there is no excessive deceleration or acceleration, the passage 76 in the valve 75 places passage 72 in fluid communication with the passage 77 in member 73 which leads to the clutch apply or actuating chamber 78. Thereby, when the device is rotating at a constant rate, pressure fluid is supplied to the chamber 78 to force the piston to maintain clamp up of the interleaved clutch plates, in the known manner. An orifice 79 continuously bleeds fluid from the actuating chamber so that if the supply line 72 is closed by the valve, the clutch releases.

Thus the pendulum valve of FIGS. 9 and 10 acts to prevent pressure fluid from entering the clutch actuating chamber when the acceleration or deceleration is excessive.

FIGS. 11 to 12

This embodiment of the invention utilizes a rolling cylinder disc 80 which moves along an inclined ramp to actuate a ball valve element 81, urging element 81 against its seat 82 to shut off the fluid supply passage 83 which would otherwise feed fluid from its source (not shown), through a manual valve 84 for example, and to the clutch apply chamber 86. An orifice 87 continuously bleeds pressure fluid from chamber 86.

This control embodiment is for a single direction of rotation of the input member 88 as shown by the curvilinear arrow. Thus the deceleration or acceleration of the input member 88 is controlled. With the direction of rotation as indicated by the arrow in FIG. 12, a deceleration will cause the disc 80 to roll up the ramp 89 toward the ball valve 81, forcing valve 81 against its seat 82, shutting off the supply of pressure fluid from passage 83 to the clutch apply chamber 86. Thereby, pressure in the clutch apply chamber 86 will immediately drop due to the orifice 87 which continuously bleeds oil from that chamber. When the deceleration decreases sufficiently or disappears, the centrifugal force will cause the disc 80 to roll back down the ramp, permitting ball valve 81 to unseat, permitting the clutch apply pressure in chamber 86 to rise. This action will balance out at a point where the equation of the clutch will be:

$T_c = T_2$ plus $K (N_2)^2$ where, $T_c$ = clutch torque at any given instant, $T_2$ = the torque, at a given instant, of the driving device which drives the clutch, such as a torque converter, to which the control mechanism is attached; or the torque, at a given instant of the load driven by the control mechanism and to which the latter is attached, $K$ = constant of proportionality of several parts of the control mechanism, $N_2$ = speed of rotation, at a given instant, of either the power input device or the load, whichever the control mechanism is attached to.

The Control Formula

The present invention provides mechanism which functions according to the above formula. The pendulum-type valve previously described also functions in this manner, the constant of proportionality K depending on the mass of the pendulum, length of the pendulum, the length of the radius from the center of the clutch at which the pendulum is pivoted, and the angle through which the pendulum must swing in order for the valving action to occur.

In the embodiment of the invention where the present clutch control is located behind a torque converter and the control is attached to the converter, the centrifugal force on the ball 25, disc 80, or weight 50a acting on the ramp or pendulum end provides the $K (N_2)^2$ formula. This valving, of course, allows this term plus $T_2$ to control the clutch. If the clutch torque $T_c$ is larger than $T_2$ plus $K (N_2)^2$, the valving reduces the clutch piston pressure, and if the torque $T_c$ is less than $T_2$ plus $K (N_2)^2$, the valving increased the clutch piston pressure.

When the invention is not used behind a converter, the control equation of the present invention is $T_c = T_L$ plus $K (N_2)^2$ where $T_L$ is the steady state torque of either the load or prime mover, depending on which of the two the control is located on, and $N_2$ is the speed of the load or prime mover.

FIG. 13

FIG. 13 is similar to device of FIGS. 11 and 12 except that a feedback dump valve 91 is provided instead of the bleed orifice 87 of the FIG. 2 device. This valve may be of the type shown in the U.S. Pat. application of Gordon Olsen, U.S. Ser. No. 784,627, filed Dec. 18, 1968 which issued on Nov. 3, 1970 as U.S. Pat. No. 3,537,557. It is believed sufficient to say that pressure from an external manual valve (not shown) flows radially outward through passage 84a and when of sufficient magnitude, will force the shiftable valve element 92 radially inward. Pressure then is communicated to the clutch feed line 83 that flows to the valve seat 82 and valve ball and thence to the clutch. Feedback to the area on the radially inside end of the dump valve is obtained by the holes 93 through the head 94 of the valve element 92, which holes 93 are always in communication with the clutch feed line 83. The feedback dump valve, when in the radially outer position shown in FIG. 13, empties the clutch through the holes 96 in member 80 and bushing 97 that lead to the clutch apply chamber 86, through the annular groove 96a in bushing 97 and then through holes 95 in valve 92 and finally through the axial hole 98 in valve 92.

FIG. 13A illustrates the inner position of valve element 92 when it blocks flow from holes 96 and groove 96a.

The advantage of this combination of valve 81 and dump valve 91 is twofold. First, the necessity for continuous flow of oil through the clutch is eliminated because the bleed orifice is eliminated. Secondly, the fundamentals of the feedback dump valve allow the centrifugal pressure of the oil to be removed and the actual pressure to the clutch be reduced as a function of the speed squared, creating less pressure for the disc 80 to oppose at high rotating speeds.

FIGS. 14 AND 15

These FIGS. illustrate a clutch having two control devices D3 and D4. These control devices are shown as being of the rolling disc type, one device operating in one direction of rotation of the clutch, and the other device operating when the clutch rotates in the other direction. These devices D3 and D4, respectively, include the disc 100 and the disc 101 which are rolling on their respective ramps 100a and 101a. A bleed orifice 102 is provided adjacent the control device D3.

In this embodiment the pressure fluid flows from a valve (not shown) through the radially outwardly extending passage 104 where it surrounds a valve piston 105 that is slideable in a bore 106. The bore 106 is arranged generally at a normal angle to the radius of the clutch. The valve piston 105 has holes 107 which permit the pressure fluid from passage 104 to flow to the interior of the piston 105.

When no excessive acceleration in either direction exists, the fluid in the interior of the piston flows out between the piston and a plunger 108, which is also slideable in the carrier. This fluid enters chamber 109 and through hole 110 in communication therewith, the fluid directly flows into the clutch apply chamber to apply the clutch. On the other side of the piston 105 is located another slideable plunger 118 and chamber 119 communicates in a likewise manner via hole 120 to the clutch apply chamber. Pressure in chamber 119 balances the forces on piston 106 caused by pressure in chamber 119.

Should excessive acceleration in one direction cause the disc 100 to move towards piston 105, the disc 100 will force the plunger 108 against piston 105, thereby stopping flow of fluid from chamber 107 to chamber 109 and consequently, to the clutch via hole 110. The clutch will thus be released thereby decreasing the acceleration causing the disc 100 to move away from the piston 105 thereby functioning in the manner heretofore described. The piston 105 will be unable to move because it abuts against the other plunger 118, which in turn abuts against the disc 101. The disc 101 is held in the fixed position by its centrifugal force and the fact that the acceleration is in a direction in which the disc 101 cannot move.

In the event that the acceleration changes its direction, thereby causing disc 101 to move towards the piston 105, the disc 101 will push on plunger 118 which in turn pushes on the piston 105 thereby moving the latter against the plunger 108. However, plunger 108 is unable to move because it abuts against the disc 100 which is fixed in its position by centrifugal force and also the acceleration brings it against its stop.

The flow from the interior 107 of the piston 105 to chamber 109 and then to the clutch via hole 110 is thus reduced by movement of piston 105, again reducing engagement of the clutch, and in turn reducing the acceleration thereby permitting disc 101 to move away from piston 105 and reapply the clutch.

The clutch chamber, as previously described, is continuously bleeding to the sump via the bleed orifice 102.

I claim:

1. In a power transmission, a slipping drive establishing means having an actuating chamber, and an input member and an output member operatively connected to said drive establishing means, and a centrifugal valve means in fluid communication with said actuating chamber and carried by one of said members and angularly shiftable in a generally circumferential direction with respect to one of said members so as to be responsive to a combination of rotational speed and deceleration or acceleration of said one of said members to automatically and infinitely vary engagement of said drive establishing means, said centrifugal valve means including a valve seat, a shiftable valve member abuttable with said seat, a bodily shiftable mass for abutment with said valve member, a ramp surface along which said bodily shiftable mass moves, said ramp surface being inclined to a radial line passing through the axis of rotation of said drive establishing means and through said surface.

2. The transmission of claim 1 further characterized in that said valve means is located on said input member to sense the deceleration of said input member.

3. The transmission described in claim 1 further characterized in that said valve means is located on said output member to sense the acceleration of said output member.

4. A power transmitting device of the type having an input member and an output member, interleaved friction plates connected between said members for connecting them together in disengageable driving relationship, and hydraulic clutch apply means including an expansible fluid pressure apply chamber for varying the degree of engagement of said plates; the improvement comprising, a valve means carried by one of said members and in fluid communication with said clutch apply means, said valve means being angularly shiftable in a generally circumferential direction with respect to said one of said members in response to rotational speed and deceleration or acceleration of said one of said members to thereby cause variable actuation of said clutch apply means, said valve means including a valve seat, a shiftable valve member abuttable with said seat, a bodily shiftable mass for abutment with said valve member, a ramp surface along which said bodily shiftable mass moves, said ramp surface being inclined to a radial line passing through the axis of rotation the friction plates and through said surface.

5. The transmission of claim 4 further characterized in that said valve means is located on said input member to sense the deceleration of said input member.

6. The transmission described in claim 4 further characterized in that said valve means is located on said output member to sense the acceleration of said output member.

7. Centrifugally controlled, friction clutch mechanism comprising; a rotatable driving member and a rotatable driven member, slippingly engageable friction clutch means between said members for establishing a slippable drive connection therebetween, hydraulically operated means for causing variable engagement of said friction clutch means; centrifugally operated control valve means angularly shiftable in a generally circumferential direction in respect to and mounted in one of said members and responsive to rotational speed and deceleration or acceleration thereof, said control valve means including a valve seat, a shiftable valve member abuttable with said seat, a bodily shiftable mass for abutment with said valve member, a ramp surface along which said bodily shiftable mass moves, said ramp surface being inclined to a radial line passing through the clutch mechanism axis of rotation and through said surface, and passage means placing said control valve means in operative communication with said hydraulically operated means to cause variable actuation of the latter and consequent continuously controlled and slipping engagement of said friction means in accordance with the deceleration or acceleration of said one of said members.

8. The transmission of claim 7 further characterized in that said valve means is located on said input member to sense the deceleration of said input member.

9. The transmission described in claim 7 further characterized in that said valve means located on said output member to sense the acceleration of said output member.

10. A power transmission comprising, a torque converter having a power output turbine assembly; a centrifugally controlled, friction clutch having an input member connected with said turbine assembly, gear shift means, said clutch having an output member connected with said gear shift means, said clutch also having a slipping drive establishing means including an actuating chamber, said input and output members operatively connected to said drive establishing means, and a centrifugal valve means in fluid communication with said actuating chamber and carried by one of said member and angularly shiftable in a generally circumferential direction with respect to said one of said members so as to be responsive to rotational speed and deceleration or acceleration of said one of said members to automatically and infinitely vary engagement of said drive establishing means by varying the fluid pressure in said actuating chamber, said centrifugal valve means including a valve seat, a shiftable valve member abuttable with said seat, a bodily shiftable mass for abutment with said valve member, a ramp surface along which said bodily shiftable mass moves, said ramp surface being inclined to a radial line passing through the clutch axis of rotation and through said surface.

11. A transmission as set forth in claim 10 further characterized in that said valve means is carried on said input member of said clutch so as to sense deceleration of said turbine assembly.